United States Patent [19]

Zabron et al.

[11] Patent Number: 5,558,207
[45] Date of Patent: Sep. 24, 1996

[54] BELTING HAVING SEALED EDGE AND METHOD OF MANUFACTURE

[75] Inventors: Florian S. Zabron, Orchard Park; Miles S. Rothman, Williamsville; Walter M. Kazial, Amherst, all of N.Y.

[73] Assignee: Globe International, Inc., Buffalo, N.Y.

[21] Appl. No.: 420,690

[22] Filed: Apr. 12, 1995

[51] Int. Cl.⁶ .................................................. B65G 15/34
[52] U.S. Cl. ........................................................... 198/847
[58] Field of Search ..................................... 198/846, 847

[56] References Cited

U.S. PATENT DOCUMENTS

3,415,700 12/1968 Webster ........................... 198/846 X
3,509,006 4/1970 Baxendale et al. .................. 198/847 X
4,411,947 10/1983 Heynhold ............................. 198/847 X
5,316,132 5/1994 Muraoka et al. ........................ 198/847

*Primary Examiner*—James R. Bidwell
*Attorney, Agent, or Firm*—Hodgson, Russ, Andrews, Woods & Goodyear LLP

[57] ABSTRACT

A belting having synthetic polymeric weft yarns that are associated with warp yarns of a natural fiber, is described. The belting can be woven to the broadest width allowable by a loom and then cut to a desired width. The cutting device is heated to simultaneously melt the several weft yarns which upon cooling fuse to form a sealed lateral edge that prevents the belting from fraying and unraveling at the fused edge during use. The broad cloth can also be cut to size and then the severed lateral edges is melted using a fusing device.

22 Claims, 6 Drawing Sheets

BELTING HAVING SEALED EDGE AND METHOD OF MANUFACTURE

BACKGROUND OF THE INVENTION

1. Field of the Invention

The present invention generally relates to the art of beltings and to methods of manufacture of beltings. More particularly, the present invention relates to a belting having over a majority of its width synthetic polymeric weft or fill yarns that are associated with warp yarns of a natural fiber.

The belting of the present invention begins as a cloth having a broad width. Then a cutting means is used to cut the cloth in the longitudinal direction. In one embodiment, the cutting means itself further serves to fuse the severed weft yarns. The molten polymeric material comprising the weft yarns then flows over and around the adjacent wrap yarns and provides a sealed lateral edge to the thusly manufactured belting by fusing the warps and weft yarns together. Alternatively, a separate melting means is provided to perform the fusing function after the cloth has been cut to the desired width.

It is further contemplated by the present invention that the broad width cloth can be provided with a relatively small width cutting band extending in the longitudinal direction and having both synthetic polymeric warp and weft yarns. In that respect, meltable yarns are substituted for the natural warp fibers along a portion of the broad width cloth to form the cutting band that is cut and melted to fuse both the warp and weft yarns together and thereby provide a fused lateral edge to the resulting belting.

2. Prior Art

Natural fiber beltings such as cotton beltings and the like are typically manufactured of 100% cotton, generally made to width having a "tucked" or woven lateral edge. The tucked edge eliminates or retards unravelling at the lateral edge during the belting's useful life. However, weaving or knitting a tucked edge is a time consuming and costly step. Further, a belting made entirely of cotton often needs to have its width tailored for a specific application. The belting of the present invention overcomes these shortcomings inherent in manufacturing conventional natural fiber beltings while maintaining the "soft" feel characteristics of this type of belting as well as maintaining edge integrity.

SUMMARY OF THE INVENTION

The present invention relates to a conveyor belting, which comprises: a multiplicity of substantially parallel warp yarns extending longitudinally of the conveyor belting, the warp yarns comprising natural fiber yarns extending across a majority of a width of the belting and meltable material yarns extending across at least one cutting band of the remaining width of the belting; a plurality of meltable weft yarns extending transversely of the width; and a lateral edge of the cutting band characterized by fusing of the meltable warp and weft yarns.

The present invention also relates to a conveyor belting, which comprises: at least two generally planar and parallel scrim means, each comprising a multiplicity of substantially parallel warp yarns extending longitudinally of the scrim means, the warp yarns comprising natural fiber yarns extending across a majority of a width of the belting and meltable material yarns extending across at least one cutting band of the remaining width; a plurality of meltable weft yarns comprising each of the scrim means, the weft yarns extending transversely of the warp yarns; a connecting means provided to connect the scrim means; and a lateral edge characterized by fusing of the meltable warp and weft yarns.

The present invention further relates to a conveyor belting, which comprises: a multiplicity of substantially parallel warp yarns extending longitudinally of the conveyor belting and comprised of natural fiber yarns; and a plurality of meltable weft yarns extending transversely of the warp yarn; and a lateral edge characterized by fused ends of the weft yarns.

Additionally, the present invention relates to a conveyor belting, which comprises at least two generally planar and parallel scrim means, each comprising a multiplicity of substantially parallel warp yarns extending longitudinally of the scrim means and comprised of natural fiber yarns; a plurality of meltable weft yarns comprising each of the scrim means, the weft yarns extending transversely of the warp yarns; a connecting means provided to connect the scrim means; and a lateral edge characterized by fusing of the warp and weft yarns.

The present invention also relates to a method of manufacturing a conveyor belting, which comprises: providing a multiplicity of substantially parallel warp yarns extending longitudinally of the conveyor belting, the warp yarns comprising natural fiber yarns extending across a majority of a width of the belting and meltable material yarns extending across at least one cutting band of the remaining width of the belting; incorporating a plurality of meltable weft yarns extending transversely of the warp yarns to provide a cloth; and cutting the cloth in the longitudinal direction and along the cutting band with a heated cutting means that serves to simultaneously sever and melt the meltable warp and weft yarns and thereby providing a lateral edge of the conveyor belting characterized by fusing of the warp and weft yarns.

And, the present invention relates to a method of manufacturing a conveyor belting, which comprises: providing a multiplicity of substantially parallel warp yarns extending longitudinally of the conveyor belting, the warp yarns comprising natural fiber yarns extending across a majority of a width of the belting and meltable material yarns extending across at least one cutting band of the remaining width of the belting; incorporating a plurality of meltable weft yarns extending transversely of the warp yarns to provide a cloth; cutting the cloth in the longitudinal direction and along the cutting band with a cutting means; and melting a lateral edge of the severed cloth along the cutting band with a fusing means, thereby providing the lateral edge of the conveyor belting characterized by fusing of the warp and weft yarns.

The present invention further relates to a method of manufacturing a conveyor belting, which comprises providing a multiplicity of substantially parallel warp yarns extending longitudinally of the conveyor belting and comprised of natural fiber yarns; incorporating a plurality of meltable weft yarns extending transversely of the warp yarns to provide a cloth; and cutting the cloth in the longitudinal direction with a heated cutting means that serves to simultaneously sever and melt the meltable weft yarns and thereby providing a lateral edge of the conveyor belting characterized by fusing of the warp and weft yarns.

Finally, the present invention relates to a method of manufacturing a conveyor belting providing a multiplicity of substantially parallel warp yarns extending longitudinally of the conveyor belting and comprised of natural fiber yarns; incorporating a plurality of meltable weft yarns extending transversely of the warp yarns to provide a cloth; cutting the cloth in the longitudinal direction with a cutting means to provide a lateral edge of the cloth and melting the lateral edge with a fusing means, thereby providing the lateral edge of the conveyor belting characterized by fusing of the warp and weft yarns.

These and other aspects of the present invention will become increasingly more apparent by reference to the following description and to the following drawings.

DETAILED DESCRIPTION OF THE INVENTION

Figure 1:
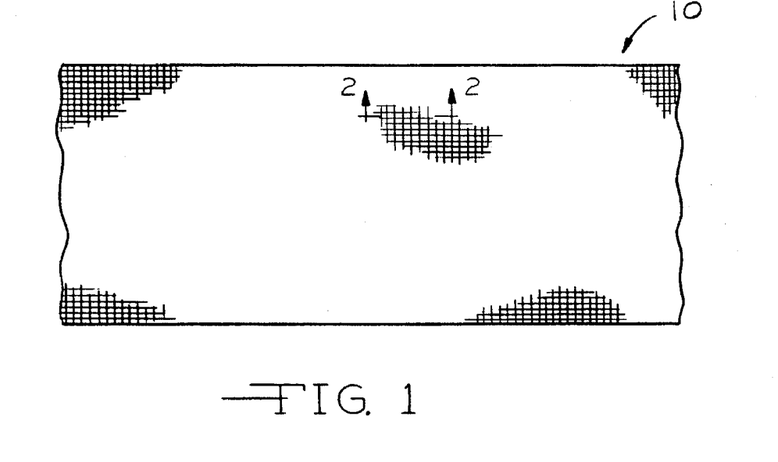
FIG. 1 is a plan view of a cloth 10 useful with the method of the present invention.
Figure 2:
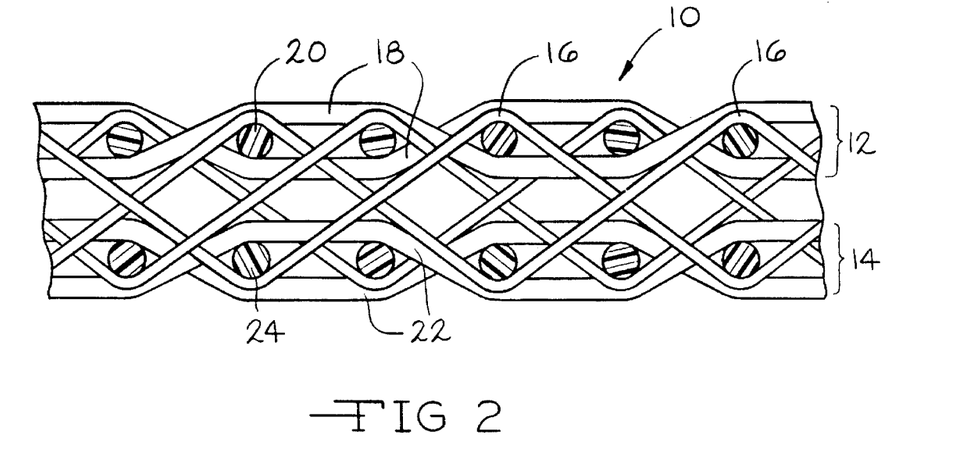
FIG. 2 is an enlarged cross-sectional view taken along line 2—2 of FIG. 1.

Referring now to the drawings, FIGS. 1 and 2 show an exemplary cloth 10 that is useful in the manufacture of a belting according to the present invention. In particular, FIG. 2 shows an enlarged cross-sectional view of a portion of the cloth 10 comprising a first scrim 12 and a substantially parallel second scrim 14 connected by a plurality of binder warp yarns 16. While the cloth 10 in FIG. 2 is shown comprising two scrims 12 and 14 as the strength members connected by the binder yarns 16, it is contemplated by the scope of the present invention that the cloth 10 can comprise a multiplicity of substantially parallel scrims, each connected to its adjacent scrims by binder yarns 16. In that respect, the double scrim cloth 10 is for illustrative purposes only, and the present invention is not intended to be so limited. If desired, an intermediate layer of staple fibers (not shown) can be provided between the double scrims 12 and 14 to build up the thickness of the cloth. Such a belting is shown and described in U.S. Pat. No. 4,156,335 to Burnett, which is assigned to the assignee of the present invention and incorporated herein by reference. Also, the cloth can consist of a single scrim without departing from the scope of the present invention.

The first scrim 12 includes longitudinally extending and lengthwise warp yarns 18 and laterally extending or crosswise weft yarns 20. The warp yarns 18 are preferably a natural fiber and the weft yarns 20 are preferably of a synthetic polymeric material. The second scrim 14 is preferably similar to the first scrim 12, and likewise has lengthwise or longitudinally extending warp yarns 22, which are preferably of a natural material, and laterally extending or crosswise weft yarns 24, which as in scrim 12, are of a similar synthetic polymeric material. The synthetic polymeric material comprising the weft yarns 20 and 24 are preferably of polyamide, polyester, polyolefin, acrylic and like fibers including blends thereof.

The connecting binder yarns 16 extend from a position overlaying a weft yarn 20 of scrim 12 to a position underlaying an obliquely situated weft yarn 24 of scrim 14 and then to a position overlaying a second obliquely situated weft yarn 20 of the first scrim 12. This pattern is continued for the length of the cloth 10. As shown in FIG. 2, the cloth 10 includes a multiplicity of connecting binder yarns 16 woven in this alternating overlaying and underlaying pattern to thereby fasten or tie the adjacent scrims 12 and 14 together. The binder yarns 16 are preferably comprised of a natural fiber, similar to that comprising the warp yarns 18 and 22 of the respective scrims 12 and 14.

It should be understood that the particular weave pattern of the cloth 10 does not, in and of itself, constitute a part of the invention separate from the cloth having associated therewith synthetic polymeric weft yarns 20 and 24, as just described. In that regard, the cloth 10 may be a woven, felted or a knitted cloth, or it may include non-woven fibers or batts. Thus, that the cloth 10 is woven, felted or knitted is not essential as long as the respective wrap yarns 18 and 20 and binder yarns 16 are of a natural material, they are independent of each other, and for the most part, they do not cross over each other indiscriminantly.

The various natural fiber warp yarns 16, 18 and 22 should have a relatively high tensile breaking strength, for example, on the order of at least about 8 lbs. per yarn, yielding a fabric strength greater than 700 lbs. per inch. Advantageously, the natural fiber warp yarns 16, 18 and 22 have low stretch properties, for example on the order of at least about 2 percent to 6 percent (½ nominal breaking load) to about 10 percent to 15 percent at break. It is also beneficial that the respective warp yarns 16, 18 and 22 exhibit uniformity in their shrink characteristics, i.e. warp yarns of a high degree of shrinkability should not be mixed with warp yarns of a low degree of shrinkability to minimize buckling or cockling of the cloth 10. Further, it is important that the warp yarns 16, 18 and 22 be selected from a wide variety of natural fibers such as cotton, jute, silk, wool and the like, cotton being most preferred. These fibers provide the resulting top and bottom major surfaces of the resulting belting with a relatively "soft" natural fiber finish that is desirable in certain applications, for example, to prevent excess run noise as the belting moves over a conveyor system (not shown) and to cushion articles carried on the belting.

Figure 3:
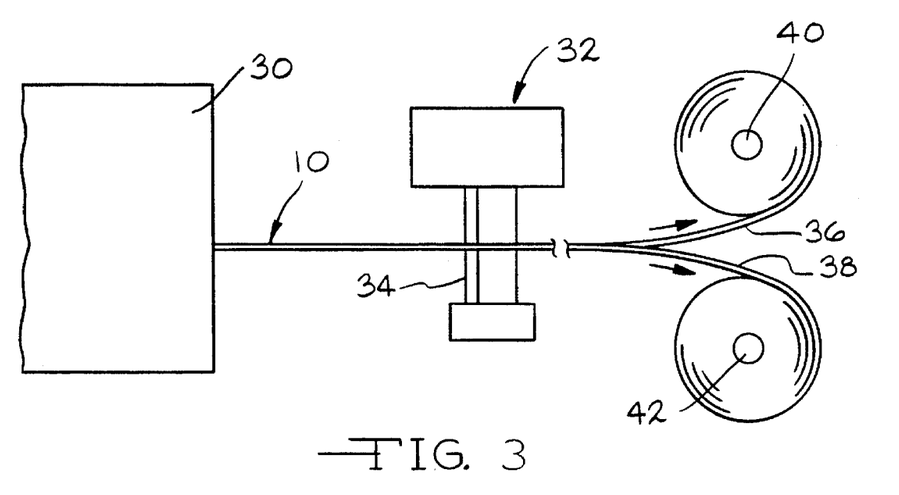
FIG. 3 is a side elevational view of the cloth 10 shown in FIG. 1 being run down a cutting device 32 having a heated knife blade 34.

As schematically shown in FIG. 3, during the manufacturing process of the present invention, the woven, felted or knitted cloth 10 is moved from a loom or knitting machine 30 to a cutting device 32 having a cutting means, such as a heated knife blade 34 positioned generally normal to the plane of the cloth 10. The heated knife blade 34 severs and simultaneously melts the synthetic polymeric material comprising the weft yarns 20 and 24 to provide belting portions 36 and 38 that are then wound up on respective take-up reels 40 and 42. As the molten polymeric material coils and hardens, a fused edge forms that seals the respective scrims 12 and 14 together at the respective lateral edges of the belt portions 36 and 38. The natural fiber yarns 18 and 22 comprising the scrims 12 and 14 and the natural fiber binder yarns 16 provide the resulting beltings with a soft, natural feel while their fused lateral edges prevent them from fraying or otherwise unravelling at the edge during use.

Figure 4:
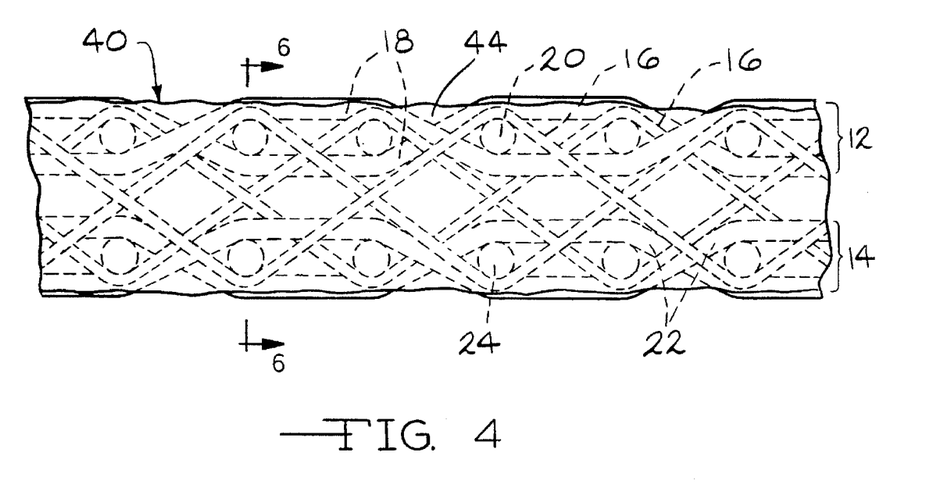
FIG. 4 is an enlarged elevational view of the fused edge of an exemplary belting 36 shown in FIG. 3.
Figure 5:
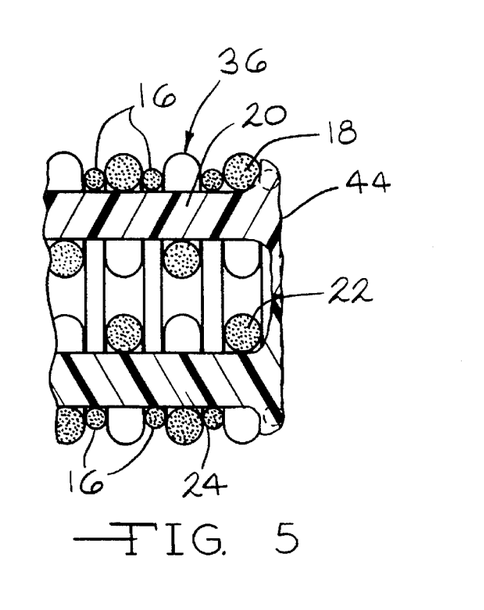
FIG. 5 is a cross-sectional view taken along line 5—5 of FIG. 4.

As shown in FIGS. 4 and 5 with respect to belting 36, the melted synthetic polymeric material then flows over and around the newly formed edge areas proximate the severed weft yarns 20 and 24. As the molten polymeric material cools and hardens, a fused edge forms that seals the respective scrims 12 and 14 together at the edge 44. In this manner, the fused synthetic polymeric weft yarns 20 and 24 seal the severed edge 44 of the belting 36 to prevent this lateral edge from fraying or otherwise unraveling during use. The natural fiber yarns 18 and 22 comprising the scrims 12 and 14 and the natural fiber binder yarns 16 provide the resulting belting 36, cut to a desired width, with a soft, natural feel. Of course, a similar situation exists for the other belting 38.

With the process of the present invention, the cloth 10 can be woven, felted or knitted to the fullest width allowable by the loom or knitting machine 30. However, it is often necessary that beltings of various widths are needed for a specific application. In that respect, the cutting means is adjustable along the broad width of the cloth 10 to provide the beltings 36 and 38 having requisite widths for a particular application. The opposite lateral edge of the beltings 36 and 38 are typically provided with a woven or tucked edge formed during the weaving, felting or knitting process.

It should be readily apparent to those skilled in the art that the beltings 36 and 38 can be provided having both of their lateral edges sealed with synthetic polymeric material according lateral edges sealed with synthetic polymeric material according to the present invention. This requires that the beltings are twice run along the cutting and fusing means or that two spaced cutting and fusing means are used, one on each lateral edge of the belting to provide the desired width.

Figure 6:
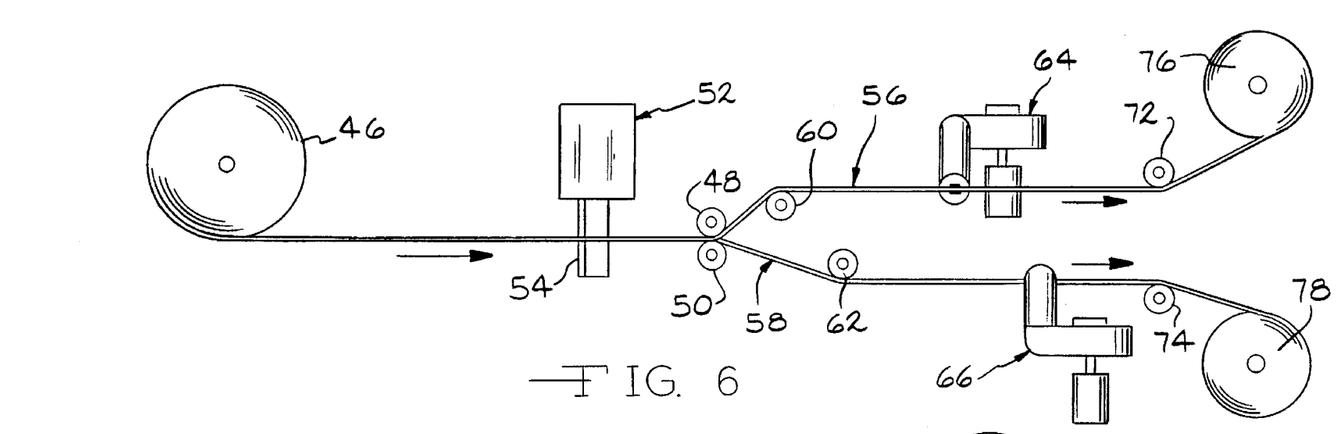
FIG. 6 is a side elevational view of the cloth 10 shown in FIG. 1 being run down a cutting device 52 used to cut the cloth in the longitudinal direction and showing hot air blowers 64 and 66 used to direct hot air jets at the formed lateral edges of the resulting belting portions 56 and 58.
Figure 7:
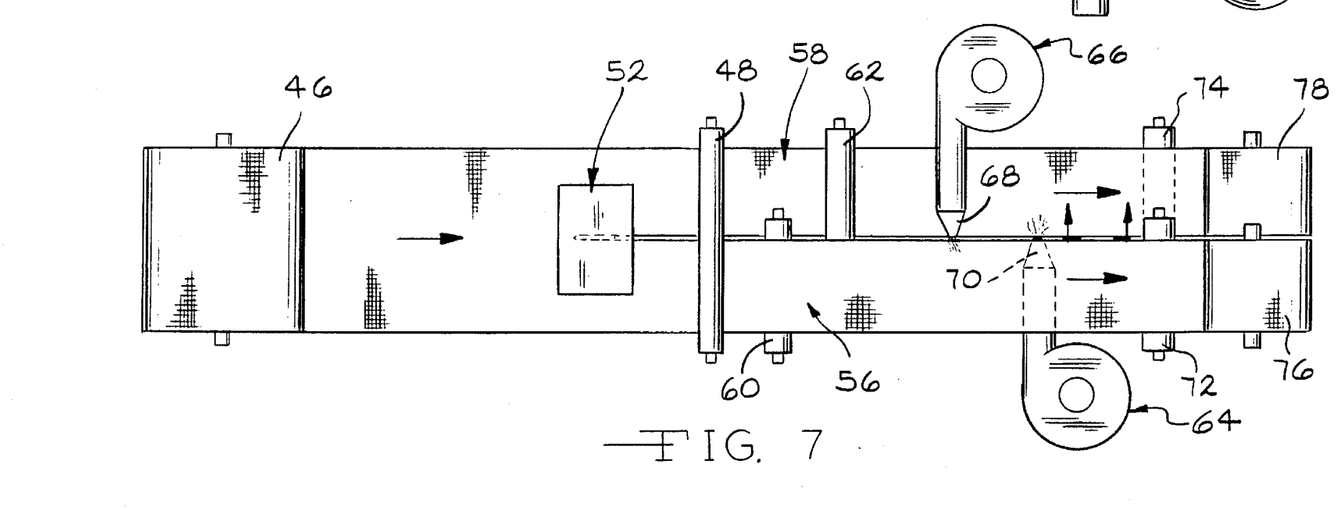
FIG. 7 is a plan view of FIG. 6.

FIGS. 6 and 7 show another preferred embodiment of the manufacturing process of a belting according to the present invention. In this embodiment, a bolt 46 of the cloth 10 is moved for example, by rollers 48 and 50 to a cutting device 52 having a cutting means, such as a knife blade 54 positioned generally normal to the plane of the cloth 10. The knife blade 54 severs the weft yarns 20 and 24 to provide belting portions 56 and 58 that are separated over rollers 60 and 62 to direct the belting portions 56,58 to respective high pressure blowers 64 and 66. The blowers are each provided with a hot air nozzle 68 and 70 disposed to direct a jet of high pressure, high temperature air at the lateral edge of the belting portions 56,58 to fuse the severed ends of the polymeric material comprising the weft yarns 20 and 24. The belting portions 56,54 then travel over rollers 72 and 74 before they are wound up on respective take-up reels 76 and 78.

The jet of air is typically at about 1,000° F., and an exemplary high pressure blower useful with the present invention is manufactured by Leister in Switzerland.

Figure 8:
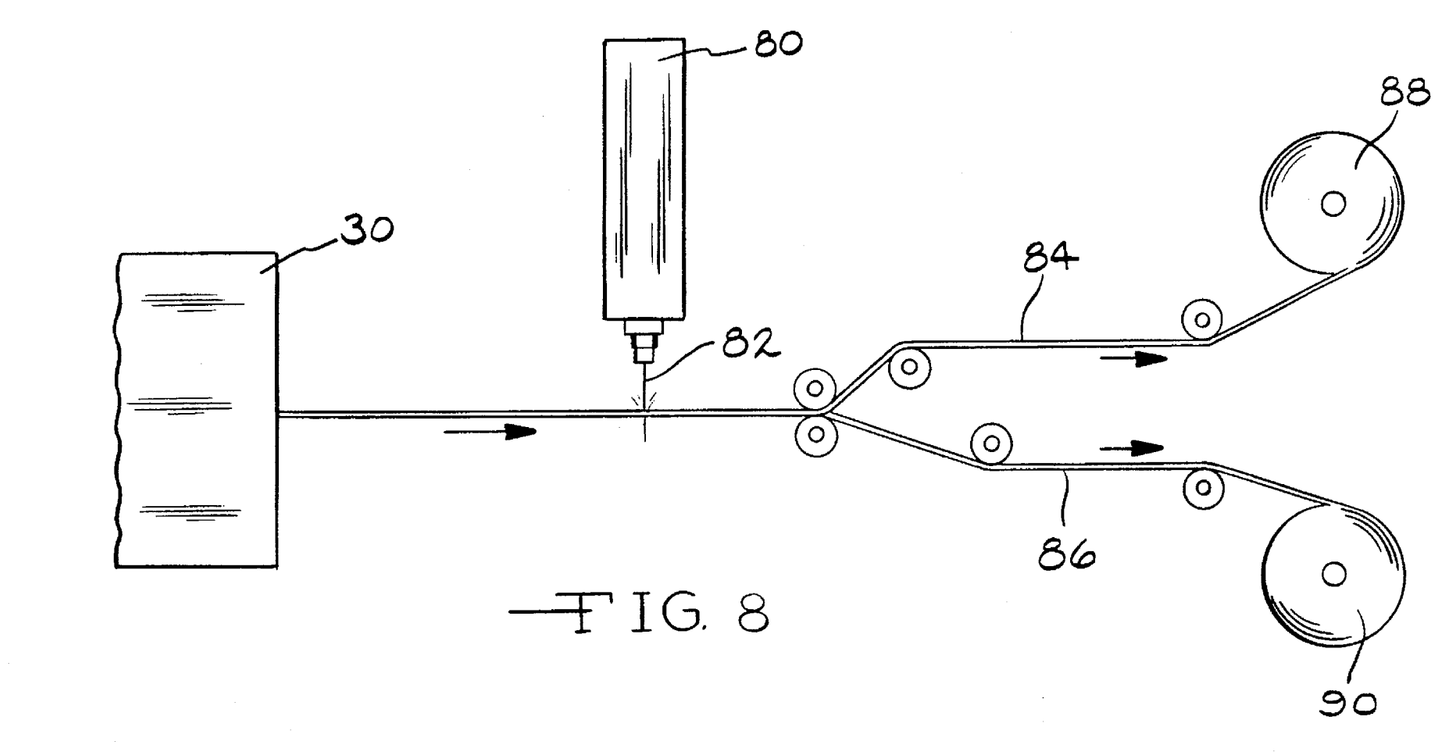
FIG. 8 is a side elevational view of the cloth 10 shown in FIG. 1 being run down a laser cutting device 80.

FIG. 8 shows still another preferred embodiment of the manufacturing process of a belting according to the present invention. In this embodiment, the cloth 10 is moved from the loom or knitting machine 30 to a cutting device 80 having a cutting means, such as a laser beam 82. The laser beam severs the weft yarns 20 and 24 to provide belting portions 84 and 86 that are wound up on respective take-up reels 88 and 90. As was the case with the heated knife blade 34, the laser beam 82 simultaneously severs the weft yarns 20 and 24 while it melts them. The molten polymeric material then cools and hardens, providing each belting portion 84 and 86 with a fused lateral edge that seals the respectively scrims 12 and 14 together at the edge. The natural fibers comprising the warp yarns 16, 18 and 22 provide the resulting top and bottom major surfaces of the beltings 84 and 86 with a relatively "soft" natural fiber finish while the fused lateral edges prevents the beltings from unraveling and fraying at the edge.

Figure 9:
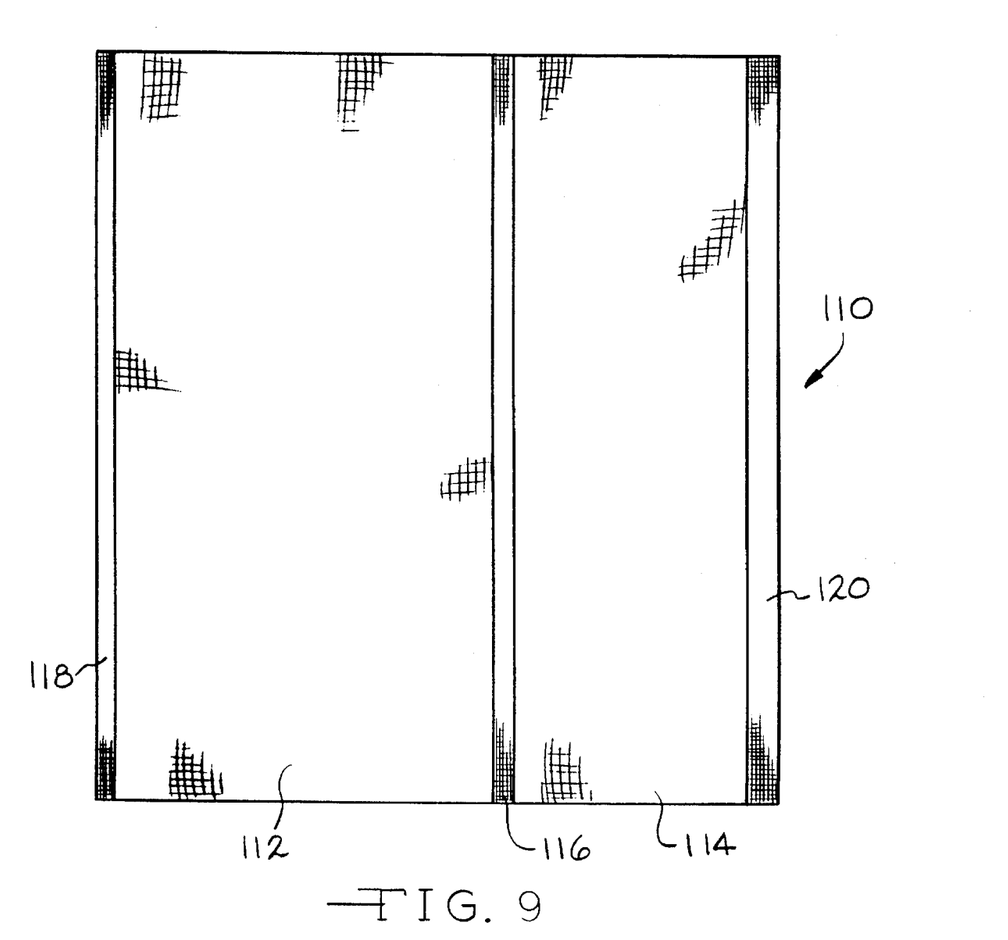
FIG. 9 is a plan view of another embodiment of a cloth 110 useful with the method of the present invention.

FIG. 9 shows a further embodiment of an exemplary cloth 110 that is useful in the manufacturing of a belting according to the present invention. Belting 110 includes a first portion 112 and a second portion 114 and an intermediate cutting band 116. The width of the first and second portions 112 and 114 are further defined by respective lateral edge portions 118 and 120. The cloth 110 comprising the first and second portions 112 and 114 and cutting bands 116, 118 and 120 is similar to the cloth 10, and as before can comprise a multiplicity of substantially parallel scrims, each connected to its adjacent scrims by binder yarns or the cloth can consist of a single scrim.

The portions 112 and 114 each include longitudinally extending warp yarns of a natural fiber and laterally extending weft yarns of a synthetic polymeric material. The cutting bands 116, 118 and 120 are each formed by substituting a synthetic polymeric material for the longitudinally extending warp yarns. The weft yarns extending laterally across the broad width of the belting 110 consisting of the first and second portions 112 and 114 and the cutting bands 116, 118 and 120 are of the synthetic polymeric material. This construction provides the bands 116, 118 and 120 woven or knitted with warp and weft yarns that are both of synthetic polymeric material to enhance the sealing edge when the belting is subsequently run down the heated cutting means 34 (FIG. 3). The belting 110 can also have its cutting bands 116, 118 and 120 severed in the lengthwise direction by the cutting machine 54 (FIGS. 6 and 7) and the exposed edges then subjected to hot air blowers 64 and 66 to fuse both the synthetic warp and weft yarns at the edge. Typically, the cutting bands 116, 118 and 120 have a width of between about 0.25 inches to 2.0 inches, with about 1.0 inch being generally preferred.

As in the previously described embodiments of the present invention the natural fibers can comprise cotton, jute, silk, wool and combinations thereof, and the synthetic polymeric yarns can comprise a polyester, polyamide, polyolefin and acrylic, and mixtures thereof. Also, while FIG. 9 shows the belting 110 having two portions 112 and 114 with natural warp yarns, it is contemplated by the scope of the present invention that a greater number of such portions can extend across the width of the belting 110, each portion separated from its adjacent portions by a cutting band of both synthetic warp and weft yarns. Further, both of the later almost edges of an individual belting portion need not necessarily be of synthetic material. As long as the thusly formed belting has at least one edge characterized by fusing of the weft yarns, such a belting is within the scope of the present invention.

While various embodiments of the present invention have been shown and described, it will be readily apparent to those skilled in the art that in a broad sense any cutting means such as compressed air or compressed water and the like can be used to sever the weft yarns to provide the belting edge. Then, any device that is capable of melting the synthetic polymeric material comprising the weft yarns can be used to provide the fused edge to the present belting. For example, an open flame can be used to melt the weft yarns. Also, those skilled in the art will readily realize that regardless of the means used to cut and fuse the broad width cloths 10 and 110 to provide the belting of the present invention having a fused lateral edge, that the functions of cutting and fusing can occur simultaneously or in a stepwise fashion.

It is intended that the foregoing description be only illustrative of the present invention and that the present invention be only limited by the hereinafter appended claims.

What is claimed is:

1. A conveyor belting, which comprises:
   a) a multiplicity of substantially parallel warp yarns extending longitudinally of the conveyor belting, the warp yarns comprising natural fiber yarns extending across a majority of a width of the belting and meltable material yarns extending across at least one cutting band of the remaining width of the belting; and
   b) a plurality of meltable weft yarns extending transversely of the width; and
   c) a lateral edge of the cutting band characterized by fusing of the meltable warp and weft yarns.

2. The conveyor belting of claim 1 wherein the warp and weft yarns are incorporated in a cloth.

3. The conveyor belting of claim 1 wherein the natural fiber warp yarns are selected from the group consisting of cotton, jute, silk and wool, and mixtures thereof.

4. The conveyor belting of claim 1 wherein the meltable material warp and weft yarns are selected from the group consisting of polyester, polyamide, polyolefin and acrylic, and mixtures thereof.

5. The conveyor belting of claim 1 wherein the natural fiber warp yarns comprise cotton and the meltable material warp and weft yarns comprise polyester.

6. A conveyor belting, which comprises:
   a) at least two generally planar and parallel scrim means, each comprising a multiplicity of substantially parallel warp yarns extending longitudinally of the scrim means, the warp yarns comprising natural fiber yarns extending across a majority of a width of the belting and meltable material yarns extending across at least one cutting band of the remaining width of the belting;
   b) a plurality of meltable weft yarns comprising each of the scrim means, the weft yarns extending transversely of the warp yarns;
   c) a connecting means provided to connect the scrim means; and
   d) a lateral edge characterized by fusing of the meltable warp and weft yarns.

7. The conveyor belt of claim 6 wherein the connecting means comprise binding warp yarns.

8. The conveyor belting of claim 7 wherein the binding warp yarns are of natural fibers.

9. The conveyor belting of claim 6 wherein the natural fiber warp yarns are selected from the group consisting of cotton, jute, silk and wool, and mixtures thereof.

10. The conveyor belting of claim 6 wherein the meltable material warp and weft yarns are selected from the group consisting of polyester, polyamide, polyolefin and acrylic, and mixtures thereof.

11. The conveyor belting of claim 6 wherein the natural fiber warp yarns comprise cotton and the meltable material warp and weft yarns comprise polyester.

12. A conveyor belting, which comprises:
   a) a multiplicity of substantially parallel warp yarns extending longitudinally of the conveyor belting and comprising natural fiber yarns; and
   b) a plurality of meltable weft yarns extending transversely of the warp yarn; and
   c) a lateral edge characterized by fused ends of the weft yarns.

13. The conveyor belting of claim 12 wherein the warp and weft yarns are incorporated in a cloth.

14. The conveyor belting of claim 12 wherein the natural fiber warp yarns are selected from the group consisting of cotton, jute, silk and wool, and mixtures thereof.

15. The conveyor belting of claim 12 wherein the weft yarns are selected from the group consisting of polyester, polyamide, polyolefin and acrylic, and mixtures thereof.

16. The conveyor belting of claim 12 wherein the natural fiber warp yarns comprise cotton and the weft yarns comprise polyester.

17. A conveyor belting, which comprises:
   a) at least two generally planar and parallel scrim means, each comprising a multiplicity of substantially parallel warp yarns extending longitudinally of the scrim means and comprised of natural fiber yarns;
   b) a plurality of meltable weft yarns comprising each of the scrim means, the weft yarns extending transversely of the warp yarns;
   c) a connecting means provided to connect the scrim means; and
   d) a lateral edge characterized by fusing of the warp and weft yarns.

18. The conveyor belt of claim 17 wherein the connecting means comprise binding warp yarns.

19. The conveyor belting of claim 18 wherein the binding warp yarns are of natural fibers.

20. The conveyor belting of claim 17 wherein the natural fiber warp yarns are selected from the group consisting of cotton, jute, silk and wool, and mixtures thereof.

21. The conveyor belting of claim 17 wherein the weft yarns are selected from the group consisting of polyester, polyamide, polyolefin and acrylic, and mixtures thereof.

22. The conveyor belting of claim 17 wherein the natural fiber warp yarns comprise cotton and the weft yarns comprise polyester.

* * * * *